Dec. 5, 1967  R. C. HOLCOMBE  3,356,173
POWER DRIVEN VEHICLE
Filed July 23, 1965

INVENTOR;
ROBERT C. HOLCOMBE,
BY
David Young
ATTORNEY.

United States Patent Office 3,356,173
Patented Dec. 5, 1967

3,356,173
POWER DRIVEN VEHICLE
Robert C. Holcombe, Dublin, Ohio, assignor to Jeffrey Galion Manufacturing Company, a corporation of Ohio
Filed July 23, 1965, Ser. No. 474,370
6 Claims. (Cl. 180—65)

ABSTRACT OF THE DISCLOSURE

A power driven vehicle with an electric motor to drive each traction wheel. An electric battery powers the electric motors. The electric battery is divided into two battery sections that are connected in series. Each motor is connected across one batterysection for low speed operation, and alternatively, each motor is connected across both battery sections for high speed operation.

---

Figure 1:
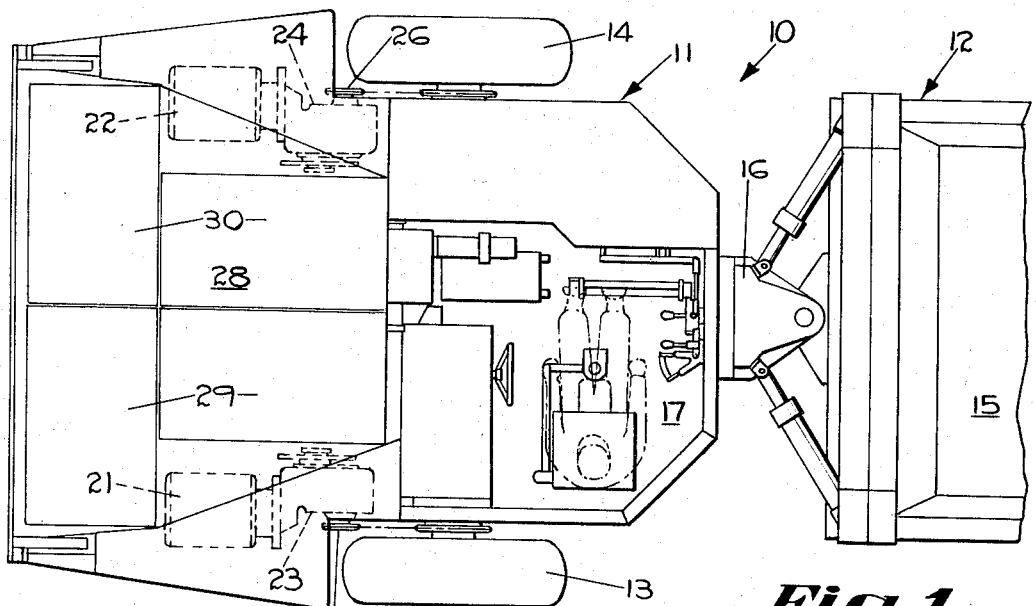

The instant invention relates to power driven vehicles, and more particularly, to a vehicle in which the traction means are driven by electric motors, with an electric battery in the vehicle for supplying power to the electric motors.

In the power driven vehicle, to which the instant invention is applicable, there is a traction wheel at each side of the vehicle, and an electric motor and a transmission for each traction wheel. An electric battery is provided in the vehicle for supplying power to the electric motors. Such battery is divided into two battery sections, with a series connection of the battery sections one to the other. In low speed operation of the motors, one motor is connected across one battery section, and the other motor is connected across the other battery section. In high speed operation of the motors, each motor is connected across both battery sections. The connections of the motors, each across one battery section, are independent, so that each motor is powered independently of the other.

It is an object of this invention to provide an improved system for operation and control of the traction means in a power driven vehicle of the type described.

It is a further object of the instant invention to provide a power driven vehicle, as described, in which the electric motors and the traction means may be driven at high and low speeds in forward and reverse directions.

It is another object of the instant invention to provide means whereby each motor may be independently powered by one section of the electric battery.

It is still another object of the instant invention to provide an improved operating system for the electric motors in a power driven vehicle such as that described above, in which one electric motor is powered by one battery section and the other electric motor is powered by another battery section for low speed operation thereof, or alternatively, but electric motors may be powered by both battery sections for high speed operation.

Other objects of the invention will appear hereinafter, the novel features and combinations being set forth in the appended claims.

In the drawings:

FIG. 1 is a plan view of a power driven vehicle embodying the invention; and

Figure 2:
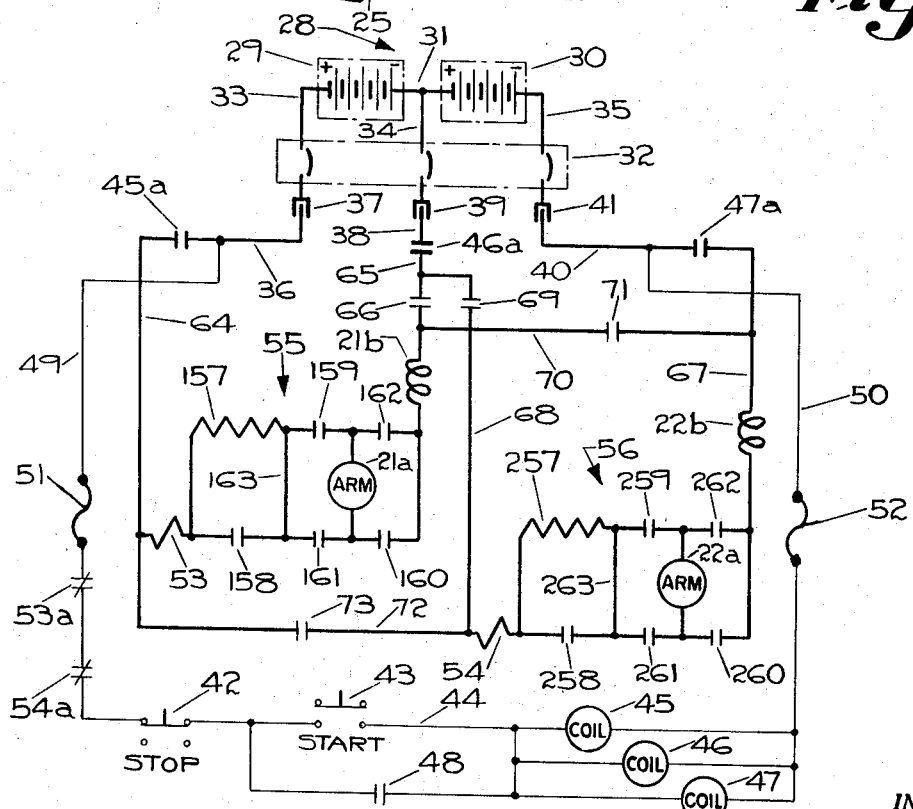

FIG. 2. is a circuit diagram of the electric battery, motors and controls.

Referring to the drawings, and particularly to FIG. 1, there is illustrated therein a power driven vehicle 10 which comprises a tractor 11 and a truck 12. The tractor 11 has a first wheel 13 and a second wheel 14 disposed at opposite sides for supporting the tractor 11 on the ground surface, and for propelling the tractor 11. The truck 12 has a load carrying body 15 for receiving a load of material to be transported by the vehicle 10. The load carrying body 15 may be supported on the ground surface by suitable wheels, or the like, which permit the truck 12 to be hauled by the tractor 11. A swivel hitch 16 connects the truck 12 to the tractor 11. At the rear of the tractor 11 there is an operator's station 17, and suitable controls for operation of the vehicle 10.

The tractor 11 includes a first direct current electric motor 21 and a second direct curent electric motor 22, which are disposed at opposite sides of the tractor 11. A first mechanical transmission 23 is secured to the first electric motor 21, to be driven by the latter, and a second mechanical transmission 24 is secured to the second electric motor 22 to be driven by the latter. A first chain and sprocket drive 25 is driven by the first mechanical transmission 23, and a second chain and sprocket drive 26 is driven by the second mechanical transmission 24. The first wheel 13 is driven by the first chain and sprocket drive 25, and the second wheel 14 is driven by the second chain and sprocket drive 26.

An electric battery 28 is placed in the forward part of the tractor 11 to supply power to the direct current electric motors 21, 22. The electric battery 28 is divided into a first battery section 29 and a second battery section 30. As will appear hereinafter, the first electric motor 21 may be powered by the first battery section 29, or alternatively, by both battery sections 29, 30. Similarly, the second electric motor 22 may be powered by the second battery section 30, or alternatively, by both battery sections 29, 30.

Referring to FIG. 2, there is illustrated therein the circuit for control and operation of the first and second direct current electric motors 21, 22. The first battery section 29 is connected to the second battery section 30 by a line 31, which is a series connection of the battery sections 29, 30. The battery 28 is connected to a three element circuit breaker 32 by lines 33, 34, 35. A first main line 36 is connected to the circuit breaker 32 by a plug and receptacle 37. A second main line 38 is connected to the circuit breaker 32 by a second plug and receptacle 39, and a third main line 40 is connected to the circuit breaker 32 by a third plug and receptacle 41. The several plugs and receptacles 37, 39, 41 are preferably combined in a single three element unit, whereby the several main lines 36, 38, 40 are simultaneously connected to the circuit breaker 32 and to the battery 28.

A normally closed stop switch 42 and a normally open start switch 43 are connected in series in line 44. A first contactor coil 45 is connected in series with the stop and start switches 42, 43. A second contactor coil 46 and a third contactor coil 47 are each connected in parallel with the first contactor coil 45, and in series with the stop and start switches 42, 43. Upon closing the start switch 43, the several contactor coils 45, 46, 47 are energized. A switch contact 48 is closed by energization of the contactor coil 45. The switch contact 48 is connected across the start switch 43. Upon release of the start switch 43, it returns to its normally open position, and since the switch contact 48 is closed, there is a closed circuit to the several contactor coils 45, 46, 47. The first contactor coil 45 is for a first main line contactor 45a, the second contactor coil 46 is for a second main line contactor 46a, and the third contactor coil 47 is for a third main line contactor 47a. The several main line contactors 45a, 46a, 47a are closed upon energization of the respective contactor coils 45, 46, 47.

The stop switch 42, the start switch 43 and the several contactor coils 45, 46, 47 are connected across the battery 28 by lines 49, 50 which are connected to the first main line 36 and to the third main line 40, respectively. The line 49 includes a fuse 51, and the line 50 includes a fuse 52. The normally closed contacts 53a of a first overload relay coil 53 and the normally closed contacts 54a of a second overload relay coil 54 are connected in series in the line 49. Upon development of an overload condition in either the overload relay coil 53 or the overload relay coil 54, the respective contacts 53a, 54a will open, thereby opening the circuit to the contactor coils 45, 46, 47 and deenergizing the latter, whereby the main line contactors 45a, 46a, 47a and also the switch contact 48 are opened.

There is a first operating and control circuit 55 for the first electric motor 21, and a second operating and control circuit 56 for the second electric motor 22. The respective operating and control circuits 55, 56 include like elements, and accordingly, only the first operating and control circuit 55 will be described in detail, it being understood that such description applies also to the second operating and control circuit 56. For convenience of reference, the same reference numbers are used for the like elements of the first and second operating and control circuits 55, 56, with the prefix numbers 1 and 2 being applied in respect of the elements in the first and second operating and control circuits 55, 56, respectively.

The first overload relay coil 53 is connected in series with the first operating and control circuit 55. The overload relay coil 53 is responsive to any overload condition that may develop in the first operating and control circuit 55 to open the switch contacts 53a, as previously described, for deenergizing the circuit. The second overload relay coil 54 is connected in series with the second operating and control circuit 56 and is responsive to any overload condition that may develop in the latter, in which event the switch contacts 54a are opened to deenergize the circuit, as previously described.

The first direct current electric motor 21 is connected in the first operating and control circuit 55 with the motor armature 21a and the field coil 21b connected in series. A starting resistance 157 is connected in series to the motor armature 21a. A switch contact 158 is connected across the starting resistance 157. Upon closing the switch contact 158, the starting resistance 157 is shorted out of the motor circuit. Switch contacts 159, 160 are connected one on each side of the motor armature 21a and in series with the latter. Switch contacts 161, 162 are similarly connected to the motor armature 21a on opposite sides of the latter and in series therewith. The switch contacts 159, 160 are opened and closed as a pair, and similarly, the switch contacts 161, 162 are opened and closed as a pair, the respective pairs of switch contacts being alternately opened or closed. Thus, the switch contacts 159, 160 connect the motor armature 21a for flow of current in one direction, and the switch contacts 161, 162 connect the motor armature 21a for current flow in the opposite direction. This provides a control for forward or reverse operation of the first electric motor 21, to propel the vehicle 10 in the forward or reverse direction. The switch contacts 159, 160 are the forward drive switch contacts for forward propulsion of the vehicle 10, and the switch contacts 161, 162 are the reverse drive switch contacts for reverse propulsion of the vehicle 10. A line 163 provides a series connection of the starting resistance 157 and the switch contact 158 to the motor armature 21a in either forward or reverse direction of operation thereof.

The second operating and control circuit 56 includes the same elements as described in respect to the first operating and control circuit 55. Thus, the operation of the second electric motor 22 may be controlled in the same manner as the first electric motor 21.

The first operating and control circuit 55, including the first electric motor 21, is connected across the first battery section 29 by a line 64 which connects through the main line contactor 45a to the first main line 36, and by a line 65 which connects through the main line contactor 46a to the second main line 38. The line 65 includes a switch contact 66 which is normally open, and which is closed to effect the connection of the first electric motor 21 across the first battery section 29.

The second operating and control circuit 56 is connected across the second battery section 30 by a line 67 which connects through the main line contactor 47a to the third main line 40, and by a line 68 which connects through the main line contactor 46a to the second main line 38. The line 68 includes a normally open switch contact 69 which is closed to effect the connection of the second operating and control circuit 56 and the second electric motor 22 across the second battery section 30.

Upon closing the switch contacts 66, 69, the respective electric motors 21, 22 are connected across the first and second battery sections 29, 30, respectively. The connections of the first and second electric motors 21, 22 across the battery sections 29, 30, each includes the line 31, which is the series connection of the battery sections 29, 30 to each other. In this connection of the electric motors 21, 22, the potential of the first battery section 29 is applied only across the first electric motor 21, and the potential of the second battery section 30 is applied only across the second electric motor 22.

The first and second electric motors 21, 22 may each be connected across both battery sections 29, 30 to apply the total potential of the battery 28 across each of the motors 21, 22. Thus, the first operating and control circuit 55 and the first electric motor 21 are conneced across both battery sections 29, 30 by the line 64 connecting through the main line contactor 45a to the first main line 36, and by a line 70 through the third main line contactor 47a to the third main line 40. The line 70 includes a switch contact 71 which is normally open, and which is closed to effect the connection of the first operating and control circuit 55, including the first electric motor 21, across both battery sections 29, 30. The second operating and control circuit 56, including the second electric motor 22, is connected across both battery sections 29, 30 by the line 67 which connects through the main line contactor 47a to the third main line 40, and by a line 72 which connects to the line 64 and thence through the main line contactor 45a to the first main line 36. The line 72 includes a normally open switch contact 73 which is closed to effect the connection of the second operating and control circuit 56, including the second electric motor 22, across both battery sections 29, 30.

The operating and control circuitry for the direct current electric motors 21, 22, which is described hereinabove, permits operation of the motors at four speeds in the forward direction and at four speeds in the reverse direction. The control of the motor operation in accomplished by selective closing of the switch contacts, as appears in the following chart:

|  | Motor 21 | | | | Motor 22 | | | |
| --- | --- | --- | --- | --- | --- | --- | --- | --- |
| Forward Speeds: | | | | | | | | |
| 1 | 66 | ------ | 159 | 160 | 69 | ------ | 259 | 260 |
| 2 | 66 | 158 | 159 | 160 | 69 | 258 | 259 | 260 |
| 3 | 71 | ------ | 159 | 160 | 73 | ------ | 259 | 260 |
| 4 | 71 | 158 | 159 | 160 | 73 | 258 | 259 | 260 |
| Reverse Speeds: | | | | | | | | |
| 1 | 66 | ------ | 161 | 162 | 69 | ------ | 261 | 262 |
| 2 | 66 | 158 | 161 | 162 | 69 | 258 | 261 | 262 |
| 3 | 71 | ------ | 161 | 162 | 73 | ------ | 261 | 262 |
| 4 | 71 | 158 | 161 | 162 | 73 | 258 | 261 | 262 |

For the purpose of accomplishing the selective closing of the several switch contacts, as stated in the above chart, a suitable cam operator may be utilized to mechanically close and open the several switch contacts in accordance with the desired direction of operation and speed of operation of the electric motors 21, 22, for propulsion of the tractor 11 accordingly.

In accordance with the instant invention, the electric motors 21, 22 have two low speeds, designated "1" and "2" in the above chart, and for operation at the low speeds the electric motors 21, 22 are separately connected across the battery sections 29, 30, respectively. One-half of the total potential of the battery 28 is applied across each electric motor 21, 22. The electric motors 21, 22 are independently connected across the respective battery sections 29, 30. Thus, if one or the other of the wheels 13, 14 slips, thereby causing a sharp decrease of load, or loss of load on the respective electric motor 21, 22, then only the one motor is affected and the other motor continues it operation and production of torque so as to propel the tractor 11. In the operation of the vehicle at the two high speeds, designated "3" and "4" in the above chart, each electric motor 21, 22 is connected across both battery sections 29, 30, so that the full potential of the battery 28 is applied across each motor.

Obviously those skilled in the art may make various changes in the details and arrangement of parts without departing from the spirit and scope of the invention as defined by the claims hereto appended, and applicant therefore wishes not to be restricted to the precise construction herein disclosed.

Having thus described and shown an embodiment of the invention, what it is desired to secure by Letters Patent of the United States is:

1. A power driven vehicle having a first traction means and a second traction means by which the vehicle is propelled, a first electric motor for driving said first traction means, a second electric motor for driving said second traction means; an electric battery in the vehicle for supplying power to said first electric motor and to said second electric motor, said battery comprising a first battery section and a second battery section, a series connection of said first battery section to said second battery section; a first operating and control circuit for said first electric motor, a second operating and control circuit for said second electric motor; motor starting and stopping means for respectively connecting and disconnecting said first operating and control circuit and said first electric motor to said battery and for respectively connecting and disconnecting said second operating and control circuit and said second electric motor to said battery; connections of said first electric motor across said first battery section including a first normally open switch contact and said series connection of the first battery section to the second battery section, and the first switch contact being connected to said series connection, connections of said second electric motor across said second battery section including a second normally open switch contact and said series connection of the first battery section to the second battery section and the second switch contact being connected to said series connection, a connection of said first electric motor across said second battery section including a third normally open switch contact, said first electric motor being connected across said first battery section by closing said first switch contact and by maintaining said third switch contact open, and alternatively said first electric motor being connected across said first and second battery sections by closing said third switch contact and by maintaining said first switch contact open, and a connection of said second electric motor across said first battery section including a fourth normally open switch contact, said second electric motor being connected across said second battery section by closing said second switch contact and by maintaining said fourth switch contact open, and alternatively said second electric motor being connected across said first and second battery sections by closing said fourth switch contact and by maintaining said second switch contact open.

2. A power driven vehicle as recited in claim 1 in which said first operating and control circuit includes a starting resistance connected in series to said first electric motor, a normally open switch contact connected in series to said first electric motor and across said starting resistance; and said second operating and control circuit includes a starting resistance connected in series to said second electric motor, and a normally open switch contact connected in series to said second electric motor and across said starting resistance.

3. A power driven vehicle having a first traction means and a second traction means by which the vehicle is propelled, a first electric motor for driving said first traction means, a second electric motor for driving said second traction means; an electric battery in the vehicle for supplying power to said first electric motor and to said second electric motor, said battery comprising a first battery section and a second battery section, a series connection of said first battery section to said second battery section; a first operating and control circuit for said first electric motor, a second operating and control circuit for said second electric motor; motor starting and stopping means for respectively connecting and disconnecting said first operating and control circuit and said first electric motor to said battery and for respectively connecting and disconnecting said second operating and control circuit and said second electric motor to said battery alternate connections of said first electric motor across said first battery section or across said first and second battery sections, said alternate connections of said first electric motor including normally open switch contact means which is selectively closed to connect the first electric motor across said first battery section or across said first and second battery sections, and alternate connections of said second electric motor across said second battery section or across said first and second battery sections, said alternate connections of said second electric motor including normally open switch contact means which is selectively closed to connect the second electric motor across said second battery section or across said first and second battery sections.

4. A power driven vehicle having a first traction means and a second traction means by which the vehicle is propelled, a first electric motor for driving said first traction means, a second electric motor for driving said second traction means; an electric battery in the vehicle for supplying power to said first electric motor and to said second electric motor, said battery comprising a first battery section and a second battery section, a series connection of said first battery section to said second battery section, a first operating and control circuit for said first electric motor, a second operating and control circuit for said second electric motor; motor starting and stopping means for respectively connecting and disconnecting said first operating and control circuit and said first electric motor to said battery and for respectively connecting and disconnecting said second operating and control circuit and said second electric motor to said battery; said first operating and control circuit including forward drive normally open switch contact means connected to said first electric motor and reverse drive normally open switch contact means connected to said first electric motor and being selectively closed to drive the first electric motor in forward or reverse direction, respectively; said second operating and control circuit including forward drive normally open switch contact means connected to said second electric motor and reverse drive normally open switch contact means connected to said second electric motor and being selectively closed to drive the second electric motor in forward or reverse direction, respectively; connections of said first electric motor across said first battery section including a first normally open switch contact and said series connection of the first battery section to the second battery section and the first switch contact being connected to the series connection, connections of said second electric motor across said second battery section including a second normally open switch contact and said series connection of the first battery section to the second battery section and the second switch contact being connected to the series connection, a connection of said first electric motor across said second battery section including a third normally open switch contact, said first electric motor being connected across said first battery section by closing said first switch contact and by maintaining said third switch contact open, and alternatively said first electric motor being connected across said first and second battery sections by closing said third switch contact and by maintaining said first switch contact open, and a connection of said second electric motor across said first battery section including a fourth normally open switch contact, said second electric motor being connected across said second battery section by closing said second switch contact and by maintaining said fourth switch contact open, and alternatively said second electric motor being connected across said first and second battery sections by closing said fourth switch contact and by maintaining said second switch contact open.

5. A power driven vehicle as recited in claim 4 in which said first operating and control circuit includes a starting resistance connected in series to said first electric motor, and a normally open switch contact connected in series to said first electric motor and across the starting resistance, and said second operating and control circuit includes a starting resistance connected in series to said second electric motor and a second normally open switch contact connected in series to said second electric motor and across the starting resistance.

6. A power driven vehicle having a first traction means and a second traction means by which the vehicle is propelled, a first electric motor for driving said first traction means, a second electric motor for driving said second traction means; an electric battery in the vehicle for supplying power to said first electric motor and to said second electric motor, said battery comprising a first battery section and a second battery section, a series connection of said first battery section to said second battery section; a first operating and control circuit for said first electric motor, a second operating and control circuit for said second electric motor; motor starting and stopping means for respectively connecting and disconnecting said first operating and control circuit and said first electric motor to said battery and for respectively connecting and disconnecting said second operating and control circuit and said second electric motor to said battery; said first operating and control circuit including a starting resistance connected in series to said first electric motor, a normally open switch contact connected in series to said first electric motor and across said starting resistance, a pair of forward drive normally open switch contacts connected in series with said first electric motor and in series with said starting resitsance and in series with said normally open switch contact, a pair of reverse drive normally open switch contacts connected in series with said first electric motor and in series with said starting resistance and in series with said normally open switch contact, said pair of forward drive normally open switch contacts and said pair of reverse drive normally open switch contacts being selectively closed to drive said first electric motor in forward or reverse direction, respectively; said second operating said control circuit including a starting resistance connected in series to said second electric motor, a normally open switch contact connected in series to said second electric motor and across said starting resistance, a pair of forward drive normally open switch contacts connected in series with said second electric motor and in series with said starting resistance and in series with said normally open switch contact, a pair of reverse drive normally open switch contacts connected in series with said second electric motor and in series with said starting resistance and in series with said normally open switch contact, and said pair of forward drive normally open switch contacts and said pair of reverse drive normally open switch contacts being selectively closed to drive said second electric motor in forward or reverse direction, respectively connections of said first electric motor across said first battery section including said series connection of the first battery section to the second battery section, and connections of said second electric motor across said second battery section including said series connection of the first battery section to the second battery section; said connections of said first electric motor across said first battery section include a first normally open switch contact connected to the series connection of the first battery section to the second battery section; and said connections of said second electric motor across said second battery section includes a second normally open switch contact connected to the series connection of the first battery section to the second battery section; a connection of said first electric motor across said second battery section including a third normally open switch contact, said first electric motor being connected across said first battery section by closing said first switch contact and by maintaining said third switch contact open, and alternatively said first electric motor being connected across said first and second battery sections by closing said third switch contact and by maintaining said first switch contact open; and a connection of said second electric motor across said first battery section including a fourth normally open switch contact, said second electric motor being connected across said second battery section by closing said second switch contact and by maintaining said fourth switch contact open, and alternatively said second electric motor being connected across said first and second battery sections by closing said fourth switch contact and by maintaining said second switch contact open.

References Cited

UNITED STATES PATENTS

| | | | |
|---|---|---|---|
| 657,046 | 8/1900 | Trier | 180—65 X |
| 3,111,181 | 11/1963 | Yatich | 180—65 X |
| 3,134,063 | 5/1964 | Hastings | 318—39 |

FOREIGN PATENTS

| | | |
|---|---|---|
| 57,767 | 2/1913 | Austria. |
| 846,503 | 6/1939 | France. |

BENJAMIN HERSH, *Primary Examiner.*

MILTON L. SMITH, *Assistant Examiner.*